United States Patent [19]

Ingram, Jr. et al.

[11] 4,006,753
[45] Feb. 8, 1977

[54] ROTARY DISC VALVE

[75] Inventors: James R. Ingram, Jr., Dallas; Richard T. Kushmaul, Irving; John T. White, Grand Prairie, all of Tex.

[73] Assignee: Recognition Equipment Incorporated, Dallas, Tex.

[22] Filed: July 30, 1975

[21] Appl. No.: 600,398

[52] U.S. Cl. .............................. 137/607; 251/331
[51] Int. Cl.² ...................................... F16K 11/00
[58] Field of Search .......... 251/331; 137/607, 609, 137/636, 636.1, 636.2, 636.3, 636.4, 627, 630.16, 630.17

[56] References Cited

UNITED STATES PATENTS

| | | | |
|---|---|---|---|
| 1,910,491 | 5/1933 | Lynn | 251/331 X |
| 2,497,558 | 2/1950 | Reeves | 137/607 X |
| 2,519,448 | 8/1950 | Fairchild | 137/607 X |
| 2,781,780 | 2/1957 | Zahradka | 137/608 |
| 2,966,928 | 1/1961 | Fairchild | 251/331 X |
| 3,631,882 | 1/1972 | White, Jr. | 251/331 X |

FOREIGN PATENTS OR APPLICATIONS 518,708  4/1953  Belgium .............................. 251/331

*Primary Examiner*—William R. Cline
*Attorney, Agent, or Firm*—John E. Vandigriff

[57] ABSTRACT

A valve system for selective control of flow of fluids from plural sources to a common conduit. Plural valves, are aligned along the conduit at different distances from a system axis. A cam array serves to selectively force the valves against a diaphragm to close off ports leading to the conduit upon rotation about the system axis.

The invention is particularly suitable for use with a pressurized ink reservoir connected to one port, an ink solvent to a second port, and a drying gas to a third port. The valve system then may be rotated sequentially for initiating an ink operation, cleansing with the ink solvent, and drying with the gas without necessitating a disassembly of the system.

15 Claims, 4 Drawing Figures

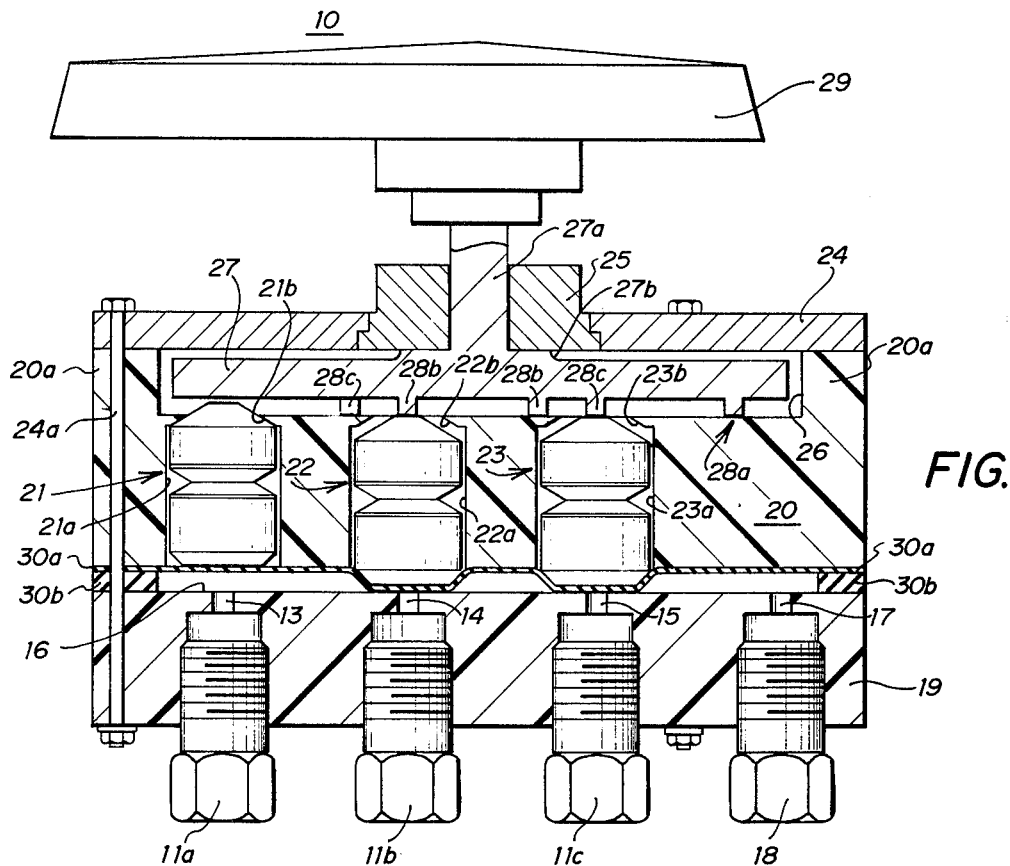
FIG. 1
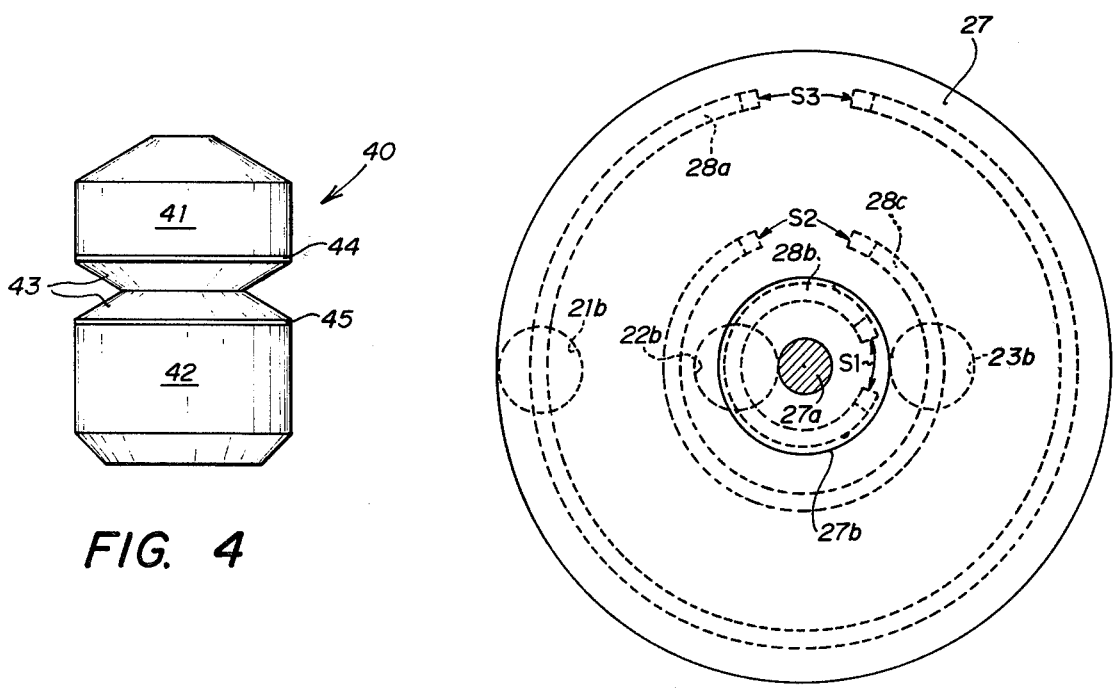
FIG. 4
FIG. 3

ROTARY DISC VALVE

FIELD OF THE INVENTION

The invention relates to fluid control valves and more particularly, to a system for use with gases and liquids adapted readily to be cleansed without disassembly.

THE PRIOR ART

Valve systems heretofore developed have included metal parts which come in direct contact with the flow of fluids to be controlled. Such metal parts have a tendency to chemically react with chemicals used to remove foreign matter during cleaning, and to a lesser extent interact with the fluids flowing through the system while in operation. Exposure to the flow of fluids accelerates the deterioration of valve seats and friction seals, and thereby permits the passage of small foreign particles into the valve system and along a fluid conduit to succeeding systems.

Prior valve systems also have required a change in valve seats and friction seals to accommodate both a change in the types of liquids used, and a change from a liquid to a gas operation. In addition, the prior systems have been susceptible to overpressure, and have required a dismantling to clear the fluid conduit of foreign matter.

The invention disclosed herein provides a valve system compatible with both gases and non-interacting liquids, without necessitating a change in valve seats or friction seals. In addition, the valve system does not come in direct contact with the liquid or gas under control, and is less prone to allow foreign particles to enter the fluid conduit. Further, the valve system is more resistant to overpressure ruptures, and does not require a dismantling to clear the conduit of foreign material.

SUMMARY OF THE INVENTION

A valve system is provided which includes plural valve assemblies for controlling the flow of a fluid through a common conduit. The valves are isolated from the fluid by a diaphragm covering the valve seats, and are activated by a drive shaft-cam assembly which selectively depresses the valves against the diaphragm to close off ports leading to the conduit. Each valve thereby controls the flow of a gas or liquid from a reservoir, and through the conduit to an exhaust port.

In a more specific aspect, a rotary actuated valve system includes a valve plate having an open mouth cylindrical bore with a closure structure only partially closing the end of the bore. A valve in the bore has an end portion seated on and protruding through the closure structure with the other end at the mouth of the cylinder. A resilient diaphragm over the plate closes the mouth of the cylinder. A reservoir plate has an inlet port spaced from the diaphragm and is aligned with the valve. An exhaust port in the reservoir plate is spaced from the inlet port and from a control axis. A cam plate faces the valve plate and is mounted for rotation about the control axis with an arcuate cam surface thereon adapted to register with the end of the valve alternately to depress the valve to force the diaphragm to close the inlet port and to release the valve to open the inlet port for flow along the reservoir plate to the exhaust port.

DESCRIPTION OF THE DRAWINGS

For a more complete understanding of the present invention and for further objects and advantages thereof, reference may now be had to the following description taken in conjunction with the accompanying drawings in which:

FIG. 1 is a sectional view of a housing encompassing a valve system of the invention;

FIG. 3 is a top view of a cam plate having illustrated thereon with dotted lines the relationship between the valve seats and the cams comprising the valve system of FIG. 1; and FIG. 4 is a side view of a valve assembly of FIG. 1.

DESCRIPTION OF PREFERRED EMBODIMENTS

Figure 2:
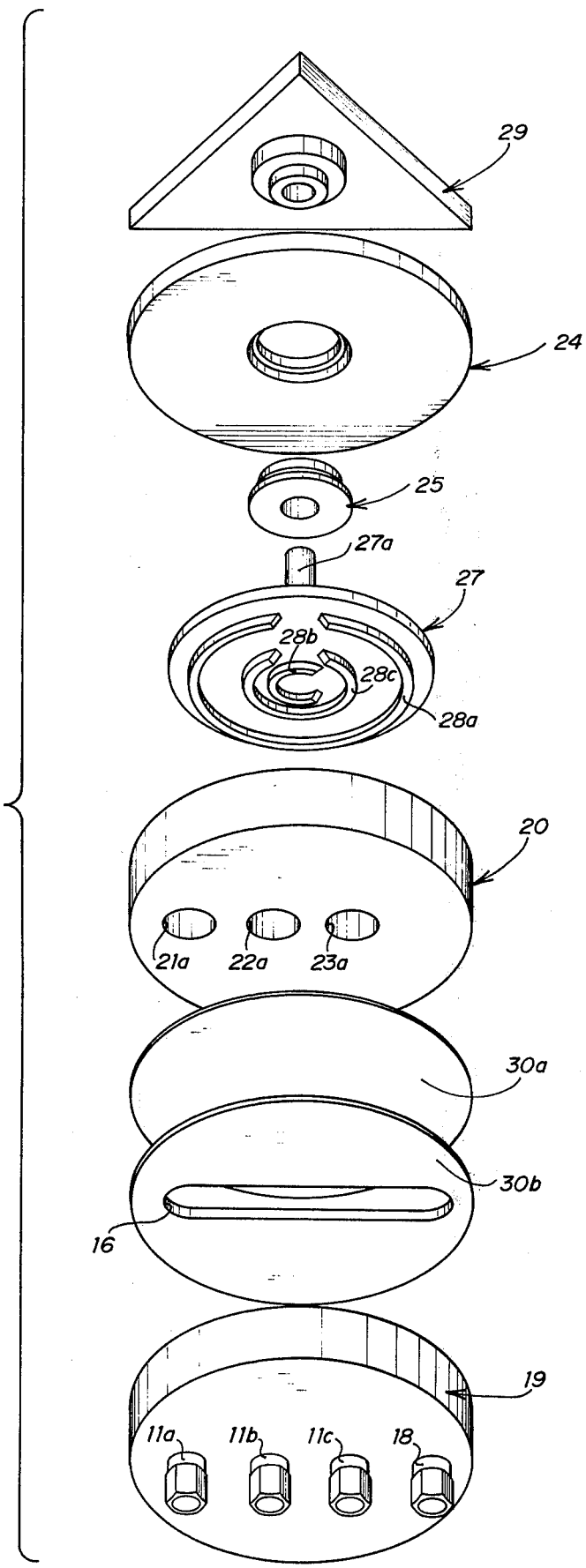
FIG. 2 is an exploded view of the valve system of FIG. 1.

FIGS. 1 and 2 illustrate a valve system having a housing comprised of a reservoir plate 19, a valve plate 20 and a bearing plate 24. Seated in plate 19 are connectors 11a, 11b and 11c leading from gas or liquid reservoirs to ports 13, 14 and 15, respectively, which are formed into plate 19. Ports 13–15 are inlets to a conduit 16 through which gas or liquid may flow to an exhaust port 17 in plate 19. Attached to exhaust port 17 is a connector 18 leading to fluid utilizing systems such as ink jet printers and the like.

Valve plate 20 has cylindrical bores 21a, 22a and 23a formed therein within which valves 21, 22 and 23 are positioned to face ports 13–15, respectively. Formed into the upper surface of plate 20 are conical openings 21b, 22b and 23b which lead in to cylinders 21a, 22a and 23a, respectively. In the raised position, upper conical surfaces of valves 21–23 abut inner walls of cylinders 21a, 22a and 23a and protrude therethrough. Valves 21–23 are retained within the cylinders but slide axially therein.

Interposed between plates 19 and 20 are diaphragms 30a and 30b. Diaphragm 30a is continuous and is made of a resilient material. It covers a lower surface of plate 20 and isolates cylinders 21a, 22a and 23a from the flow of fluids in conduit 16. Diaphragm 30b mates with diaphragm 30a and engages the surface of plate 19. Diaphragm 30b has a central aperture defining the lateral extent of conduit 16. Each of the diaphragms 30a and 30b are impermeable to and chemically passive to the fluids flowing through conduit 16.

Valve plate 20 has an upward extending rim 20a. A bearing plate 24 is secured by screws 24a to bear on rim 20a. Bearing plate 24 has a central opening within which is seated a bearing 25. The lower surfaces of bearing plate 24 and bearing 25, rim 20a and upper surfaces central to valve plate 20 define a cavity 26 below which valves 21–23 are mounted and into which they protrude.

A rotatable cam plate 27 is mounted in cavity 26. Arcuate cams 28a, 28b and 28c are formed on the lower surface thereof. A shoulder 27b on plate 27 abuts lower surface of bearing 25. A drive shaft 27a, integral to plate 27, extends upward through bearing 25 and supports a handle 29. Ports 13–15 are spaced different distances from the axis of shaft 27a as are cones 28a, 28b and 28c.

In operation, handle 29 is turned to rotate drive shaft 27a and plate 27. Valves 21–23 are thereby selectively depressed by cams 28a, 28b and 28c, respectively. When a valve is in the depressed position, diaphragm 30a is pressed against a proximate port to prevent a fluid from flowing through the port into conduit 16.

The invention is particularly useful in the ink supply system of ink jet printers where the chemicals involved present problems. Such printers are described in U.S. Pat. No. 3,596,276.

In the preferred embodiment, diaphragms 30a and 30b are made of a fluorocarbon polymer such as tetrafluoroethylene, made and sold by E. I. duPont de Nemours Company under the trademark TEFLON. The fluorocarbon polymer is impermeable to fluids flowing through conduit 16, and serves to reduce the occurrence of harmful chemical reactions with such fluids. Reservoir plate 19, valve plate 20 and connectors 11a–11c and 18 may be formed from a non-corrosive metal such as stainless steel.

In use in connection with an ink jet printer, connector 11a preferably is attached to a gas reservoir filled with air or nitrogen gas. Connector 11b is attached to a pressurized liquid solvent reservoir having acetone stored therein. Connector 11c is attached to pressurized ink reservoir.

In the embodiment shown, when handle 29 is turned to elevate valve 23, ink flows from connector 11c through port 15, and along conduit 16 to exhaust port 17. After an ink operation, valve 22 is elevated to allow acetone to flow through port 14 to clean the conduit and exhaust port 17. After flushing the system with the acetone, handle 29 again may be rotated to elevate valve 21. Gas then may flow from connector 11a and through port 13 to dry out the conduit, and place the system in condition for another ink operation.

In accordance with the invention, the valve system disclosed herein may be used with both gases and non-interacting liquids without necessitating the change of valve seats or valve seals. Further, the valve system need not be dismantled to clean the conduit 16 or exhaust port 17 of foreign material. In addition, the valves and the valve seats are isolated from the fluid flow to substantially decrease deterioration caused by chemical reactions.

The relationship between the arcuate cams formed on plate 27 and the valves 21–23 may be understood from FIG. 3. Cam 28b is symmetrical to drive shaft 27a. A 40° separation S1 is formed between beveled end surfaces. Cam 28c is concentric to cam 28b. Cam 28c has a 40° separation S2 between beveled end surfaces. Cam 28c, however, is rotated 90° with respect to cam 28b to allow a selection between valves 22 and 23. A third cam, cam 28a, is concentric to and encompasses cam 28c. The beveled end surfaces of cam 28a have a 20 degree separation, S3, and are symmetrical to a radial line equidistant the end surfaces of cam 28c.

Cams 28a, 28b and 28c are of a radial width to centrally engage upper surfaces of valves 21, 22 and 23, which protrude from cylinders 21b, 22b and 23b, respectively.

With plate 27 rotated to the position shown in FIG. 3, all valves are depressed to place the valve system in a quiescent state. When plate 27 is rotated clockwise 90 degrees, however, valve 21 is driven upward to open port 13 of FIG. 1, while valves 22 and 23 remain depressed. A further clockwise rotation of 90° opens port 14, but causes ports 13 and 15 to be closed off. An additional clockwise rotation of 90° opens port 15, and closes off ports 13 and 14.

FIG. 4 illustrates valve 40 for operation in each of cylinders 21a, 22a and 23a. An upper piston 41, preferably is formed from stainless steel to engage the cams such as plate 27. A lower piston 42 preferably formed from an acetal plastic to operate against diaphragm 30a. Interposed between pistons 41 and 42 are a pair of spring washers 43 which compress under pressure, thereby preventing destruction of the valve assembly when an overpressure occurs. Spring washers 43 bear against and are separated from pistons 41 and 42 by a pair of spacer discs 44 and 45. Discs 44 and 45 may be selected in thickness to provide an overall valve assembly length compatible with the system in which the valve operates.

Having described the invention in connection with certain specific embodiments thereof, it is to be understood that further modifications may now suggest themselves to those skilled in the art, and it is intended to cover such modifications as fall within the scope of the appended claims.

What is claimed is:

1. A valve system for controlling the flow of fluids from a pressurized source, which comprises:
    a. a valve plate having a plurality of valves positioned therein, each valve including first and second pistons, a pair of spacer discs interposed between said pistons and a spring means interposed between said pair of spacer discs;
    b. a reservoir plate having a plurality of inlet parts and an outlet part, each of said inlet parts facing one of said valves;
    c. a resilient diaphragm interposed between said valve plate and said reservoir plate for isolating said plurality of valves from the flow of said fluids;
    d. a conduit diaphragm interposed between said resilient diaphragm and said reservoir plate, and having a central opening of width corresponding to the width of said valve and providing fluid communications between all of said parts; and
    e. a single cam means contiguous to the side of said valve plate opposite said diaphragms actuating said valves in sequence to force said resilient diaphragm onto said inlet parts and to close the same.

2. The system set forth in claim 1, wherein said resilient diaphragm and said conduit diaphragm are formed from a fluorocarbon polymer.

3. The system set forth in claim 2, wherein said fluorocarbon polymer is tetrafluoroethylene.

4. The system set forth in claim 1, wherein said first piston is metal and said second piston is plastic.

5. The system set forth in claim 1, wherein said cam means includes a rotatable cam plate having a plurality of arcuate cams formed thereon selectively to engage said valves.

6. A system controlling the flow of fluids through a conduit, wherein said system may be cleansed of foreign material without disassembly, which comprises:
    a. a reservoir plate having formed therein inlet ports and an outlet port spaced different radii from a system center axis;
    b. a valve plate having valves therein, one facing each of inlet said ports, said valves being slidably housed within said valve plate, each of said valves including two pistons and resilient means to maintain a separation therebetween;
    c. a resilient diaphragm adjacent said valve plate;
    d. a conduit diaphragm interposed between said resilient diaphragm and said reservoir plate, and having an aperture encompassing all of said ports;

e. a bearing plate secured to said valve plate and having a bore at said axis; and f. a cam plate rotatable between said valve plate and said bearing plate, with cam surfaces thereon for selectively engaging said first piston of each said valves, and with drive means including a shaft connected to said cam plate and protruding through said bore.

7. The valve system set forth in claim 6, wherein one of said inlet ports is connected to a gas reservoir, a second of said ports is connected to a chemical solvent reservoir, a third of said ports is connected to a liquid reservoir.

8. The valve system set forth in claim 7, wherein said gas reservoir contains air under pressure, said chemical solvent reservoir contains acetone, and said liquid reservoir contains ink which dissolves in acetone.

9. The valve system set forth in claim 8, wherein said resilient diaphragm and said conduit diaphragm are chemically passive and impermeable to said fluids.

10. The valve system set forth in claim 9, wherein said resilient diaphragm and said conduit diaphragm are comprised of a fluorocarbon polymer.

11. The valve system set forth in claim 10, wherein said fluorocarbon polymer is tetrafluoroethylene.

12. The valve system set forth in claim 7 wherein said gas reservoir is filled with nitrogen.

13. The valve system set forth in claim 6, wherein separate cam surfaces are arcuate with symmetry about said axis and in rotational relationship to provide a selective activation of said valve assemblies.

14. The valve system set forth in claim 6, wherein said reservoir plate, said valve plate, said cam plate and said bearing plate are formed from a non-corrosive material.

15. The valve system set forth in claim 14, wherein said non-corrosive material is stainless steel.

* * * * *